US011151452B2

(12) United States Patent
Walters et al.

(10) Patent No.: US 11,151,452 B2
(45) Date of Patent: Oct. 19, 2021

(54) SYSTEMS AND METHODS FOR LEGAL DOCUMENT GENERATION

(71) Applicant: Capital One Services, LLC, McLean, VA (US)

(72) Inventors: Austin Walters, McLean, VA (US); Jeremy Edward Goodsitt, McLean, VA (US); Fardin Abdi Taghi Abad, Seattle, WA (US); Reza Farivar, McLean, VA (US); Vincent Pham, McLean, VA (US); Mark Watson, McLean, VA (US); Kenneth Taylor, Champaign, IL (US); Anh Truong, McLean, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 75 days.

(21) Appl. No.: 16/277,324

(22) Filed: Feb. 15, 2019

(65) Prior Publication Data
US 2020/0184330 A1 Jun. 11, 2020

Related U.S. Application Data

(60) Provisional application No. 62/776,954, filed on Dec. 7, 2018.

(51) Int. Cl.
G06N 3/08 (2006.01)
G06Q 50/18 (2012.01)
(Continued)

(52) U.S. Cl.
CPC .............. G06N 3/08 (2013.01); G06F 40/289 (2020.01); G06N 3/0454 (2013.01); G06Q 50/18 (2013.01)

(58) Field of Classification Search
CPC ...... G06N 3/08; G06N 3/0454; G06F 40/289; G06Q 50/18
See application file for complete search history.

(56) References Cited

U.S. PATENT DOCUMENTS 5,787,234 A * 7/1998 Molloy ................. G06F 16/334
706/46
9,015,093 B1 * 4/2015 Commons .......... G01C 21/3602
706/26
(Continued)

OTHER PUBLICATIONS

Alschner, Wolfgang, and Dmitriy Skougarevskiy. "Can Robots Write Treaties? Using Recurrent Neural Networks to Draft International Investment Agreements." (2016): 119-114. (Year: 2016).*
(Continued)

Primary Examiner — Li B. Zhen
Assistant Examiner — Markus A. Vasquez
(74) Attorney, Agent, or Firm — Troutman Pepper Hamilton Sanders LLP; Christopher J. Forstner; John A. Morrissett

(57) ABSTRACT

A system is configured to receive first training data, train a first neural network (NN) based on the first training data, receive second training data, train a second NN based on the second training data, receive a first plain English phrase, provide the first plain English phrase to the first NN, generate, via the first NN, one or more first legal clauses based on the first plain English phrase, receive a second plain English phrase, provide the second plain English phrase to the first NN, generate, via the first NN, one or more second legal clauses based on the second plain English phrase, provide the one or more first legal clauses and the one or more second legal clauses to the second NN, and generate, via the second NN, a legal document based on the one or more first legal clauses and the one or more second legal clauses.

20 Claims, 6 Drawing Sheets

(51) Int. Cl.
*G06N 3/04* (2006.01)
*G06F 40/289* (2020.01)

(56) References Cited

U.S. PATENT DOCUMENTS

| | | | |
|---|---|---|---|
| 9,754,206 B1 | 9/2017 | Brestoff | |
| 2006/0053001 A1* | 3/2006 | Brockett | G06F 17/2765 704/9 |
| 2011/0046944 A1 | 2/2011 | Sparks | |
| 2013/0091422 A1* | 4/2013 | Potnis | G06F 17/2229 715/255 |
| 2014/0025608 A1 | 1/2014 | Miller et al. | |
| 2014/0229158 A1 | 8/2014 | Zweig et al. | |
| 2017/0200076 A1 | 7/2017 | Vinyals et al. | |
| 2018/0247205 A1* | 8/2018 | Fu | G06N 5/02 |
| 2019/0028909 A1* | 1/2019 | Mermoud | H04W 24/08 |
| 2019/0108834 A1* | 4/2019 | Nelson | G06Q 10/10 |
| 2019/0115008 A1* | 4/2019 | Jiang | G06F 17/2881 |
| 2019/0147042 A1* | 5/2019 | Raghavan | G06F 40/30 706/11 |
| 2019/0236486 A1* | 8/2019 | Azab | G06N 20/00 |

OTHER PUBLICATIONS

Young, Tom, et al. "Recent trends in deep learning based natural language processing." ieee Computational intelligenCe magazine 13. 3 (2018): 55-75. (Year: 2018).*

Alschner, Wolfgang, and Dmitriy Skougarevskiy. "Towards an automated production of legal texts using recurrent neural networks." Proceedings of the 16th edition of the International Conference on Articial Intelligence and Law. ACM, 2017. (Year: 2017).*

Li, Jiwei, Minh-Thang Luong, and Dan Jurafsky. "A hierarchical neural autoencoder for paragraphs and documents." arXiv preprint arXiv:1506.01057 (2015). (Year: 2015).*

Alschner, Wolfgang, and Dmitriy Skougarevskiy. "Towards an automated production of legal texts using recurrent neural networks." Proceedings of the 16th edition of the International Conference on Articial Intelligence and Law. 2017. (Year: 2017).*

Drissi, Y. et al., "PatentAI: IP Infringement Detection with Enhanced Paraphrase Identification," NIPS, Dec. 5, 2018 (1 page).

Jaques, N.—Tuning Recurrent Neural Networks with Reinforcement Learning; Nov. 9, 2016; https://magenta.tensorflow.org/2016/11/09/tuning-recurrent-networks-with-reinforcement-learning.

Drissi, Y. et al.—PatentAI: IP Infringement Detection with Enhanced Paraphrase Identification; Dec. 5, 2018; https://neurips.cc/Conferences/2018/Schedule?showEvent=12177.

Auli, M., et al.—A novel approach to neural machine translation; May 9, 2017; https://code.fb.com/ml-applications/a-novel-approach-to-neural-machine-translation/.

Shankar, T., et al.—Reinforcement Learning via Recurrent Convolutional Neural Networks; Jan. 9, 2017; https://arxiv.org/abs/1701.02392.

Wikipedia, Garbled Circuit, https://en.wikipedia.org/wiki/Garbled_circuit (as of Apr. 18, 2019).

Wikipedia, Secure Multi-party Computation, https://en.wikipedia.org/wiki/Secure_multi-party_computation (as of Nov. 18, 2018).

Yehuda Lindell, Bar-Ilan University Winter School on Secure Computation and Efficiency, Session 2: The Yao Construction and its Proof of Security (2011), https://www.youtube.com/watch?v=mtKcdje4a48 (last visited Dec. 18, 2018).

Mike Rosulek, Oregon State University, Securing Computation: A Brief History of Practical Garbled Circuit Optimizations (2015), https://www.youtube.com/watch?v=FTxh908u9y8 (last visited Dec. 18, 2018).

Kudo, T., et al.—Japanese Dependency Analysis using Cascaded Chunking, proceedings of the 6th conference on Natural language learning Aug. 31, 2002; http://www.aclweb.org/anthology/W02-2016.

Ward M. D., Markov Models for Text Analysis, Labs for 2011 Summer School, http://www.stat.purdue.edu/~mdw/CSOI/MarkovLab.html (Summer 2011).

* cited by examiner

SYSTEMS AND METHODS FOR LEGAL DOCUMENT GENERATION

CROSS-REFERENCE TO RELATED APPLICATION

This application claims the benefit of U.S. Provisional Application No. 62/776,954, filed Dec. 7, 2018, the entire contents and substance of which is hereby incorporated by reference.

FIELD OF INVENTION

The present disclosure relates to systems and methods for generating a legal document from a first plain English phrase and a second plain English phrase, and more particularly to systems and methods using two neural networks (NNs) to generate a legal document from a first plain English phrase and a second plain English phrase.

BACKGROUND

Creating legal documents can be very time consuming and potentially challenging, even for qualified legal professionals. Often, a lawyer must slowly work through a client email, write-up, or discussion to convert each requested provision into a legally binding document. Such an arduous task may be time-consuming and expensive for the client who wants the legally binding document.

Accordingly, there is a need for systems and methods for effectively and efficiently generating legal documents from plain English phrases. Embodiments of the present disclosure are directed to this and other considerations.

SUMMARY

Disclosed embodiments provide systems and methods using two NNs for generating a legal document from plain English phrases.

Consistent with the disclosed embodiments, various methods and systems are disclosed. In an embodiment, a method for generating a legal document based on a first plain English phrase and a second plain English phrase is disclosed. The method may be implemented with a computing device. The method may include receiving first training data. The method may include training a first NN based on the first training data. The method may include receiving second training data. The method may include training a second NN based on the second training data. The method may include receiving a first plain English phrase. The method may include providing the first plain English phrase to the first NN. The method may include generating, via the first NN, one or more first legal clauses based on the first plain English phrase. The method may include receiving a second plain English phrase. The method may include providing the second plain English phrase to the first NN. The method may include generating, via the first NN, one or more second legal clauses based on the second plain English phrase. The method may include providing the one or more first legal clauses and the one or more second legal clauses to the second NN. The method may include generating, via the second NN, a legal document based on the one or more first legal clauses and the one or more second legal clauses.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
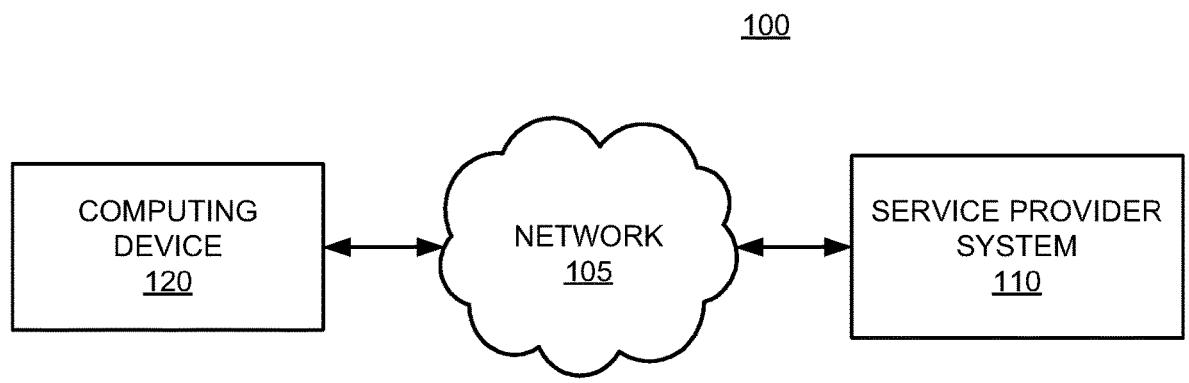
FIG. 1 is a diagram of an example system environment that may be used to implement one or more embodiments of the present disclosure.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, the term "legalese" refers to the specialized language of the legal profession.

This disclosure discusses using a first NN to generate one or more first legal clauses from a first plain English phrase one or more second legal clauses from a second plain English phrase. This disclose also discusses using a second NN to generate a legal document from one or more first legal clauses and one or more second legal clauses. It is envisioned that the first NN could be a recurrent neural network (RNN), a convolutional neural network (CNN), or a recurrent convolutional neural network (RCNN). It is envisioned that the second NN could be a recurrent neural network (RNN), a convolutional neural network (CNN), or a recurrent convolutional neural network (RCNN).

An RNN takes in characters, words, or sentences one at a time. Each of the characters, words, or sentences are fed into the RNN one after another. The RNN has cells (e.g., long short-term memory units) that can remember prior characters, words, or sentences. The RNN model can detect changes in data that changes in time, find patterns in text data, etc. In contrast, a CNN takes in all characters, words, or sentences at once making CNNs faster at computing than RNNs. Thus, CNN may be better at translating a paragraph to a sentence. However, the CNN cannot remember what happened before the paragraph since it takes all of the characters, words, or sentences in at once. The RCNN is some combination of an RNN and a CNN. Typically, the RNN will accept the output of a CNN in the RCNN.

The present disclosure relates to methods and systems for using two NNs, and, in particular, for utilizing the two NNs to generate a legal document (e.g., assignment of interest, non-disclosure agreement, employment contract, terms of service agreement) from plain English phrases. In some embodiments, a method may include receiving first training data, training a first NN based on the first training data, receiving second training data, and training a second NN based on the second training data. The method may also include receiving a first plain English phrase, providing the first plain English phrase to the first NN, and generating, via the first NN, one or more first legal clauses based on the first plain English phrase. The method may also include receiving a second plain English phrase, providing the second plain English phrase to the first NN, generating, via the first NN, one or more second legal clauses based on the second plain English phrase. The method may further include providing the one or more first legal clauses and the one or more second legal clause to the second NN and generating, via the second NN, a legal document based on the one or more first legal clauses and the one or more second legal clauses.

Reference will now be made in detail to example embodiments of the disclosed technology, examples of which are illustrated in the accompanying drawings and disclosed herein. Wherever convenient, the same references numbers will be used throughout the drawings to refer to the same or like parts.

FIG. 1 is a diagram of an example system environment that may be used to implement one or more embodiments of the present disclosure. The components and arrangements shown in FIG. 1 are not intended to limit the disclosed embodiments as the components used to implement the disclosed processes and features may vary.

In accordance with disclosed embodiments, system 100 may include a service provider system 110 in communication with a computing device 120 via network 105. In some embodiments, service provider system 110 may also be in communication with various databases. Computing device 120 may be a mobile computing device (e.g., a smart phone, tablet computer, smart wearable device, portable laptop computer, voice command device, wearable augmented reality device, or other mobile computing device) or a stationary device (e.g., desktop computer).

In some embodiments, the computing device 120 may transmit a first plain English phrase and a second plain English phrase to the service provider system 110, and the service provider system 110 may utilize a first NN to generate one or more first legal clauses based on the first plain English phrase and one or more second legal clauses based on the second plain English phrase. In other words, the service provider system, using a first NN, may translate one or more plain English phrases to one or more legal clauses. In some embodiments, the server provider terminal 110 may control the computing device 120 to implement one or more aspects of the first NN. In some embodiments, these service provider terminal 110 may using a second NN, generate a legal document from the one or more first legal clauses and the one or more second legal clauses.

Network 105 may be of any suitable type, including individual connections via the internet such as cellular or WiFi networks. In some embodiments, network 105 may connect terminals using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
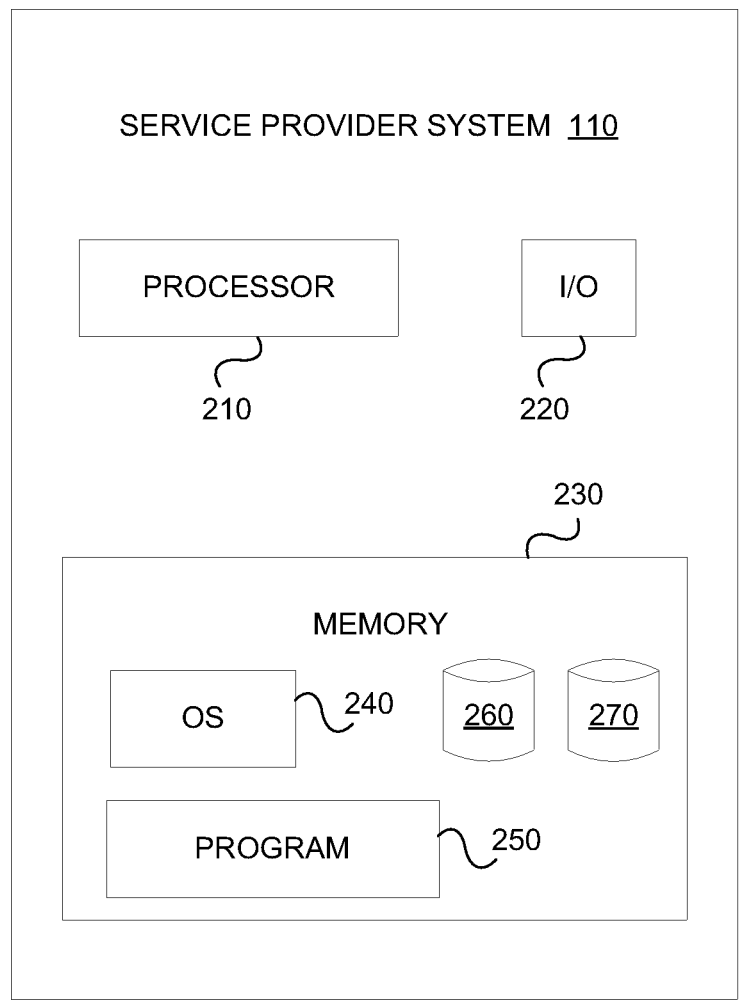
FIG. 2 is a component diagram of a service provider terminal according to an example embodiment.

An example embodiment of service provider system 110 is shown in more detail in FIG. 2. Computing device 120 may have a similar structure and components that are similar to those described with respect to service provider system 110. As shown, service provider system 110 may include a processor 210, an input/output ("I/O") device 220, a memory 230 containing an operating system ("OS") 240 and a program 250. For example, service provider system 110 may be a single server or may be configured as a distributed computer system including multiple servers or computers that interoperate to perform one or more of the processes and functionalities associated with the disclosed embodiments. In some embodiments, service provider system 110 may further include a peripheral interface, a transceiver, a mobile network interface in communication with processor 210, a bus configured to facilitate communication between the various components of the service provider system 110, and a power source configured to power one or more components of service provider system 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

As described above, service provider system 110 may configured to remotely communicate with one or more other devices, such as computer device 120. According to some embodiments, service provider system 110 may utilize an NN to translate a plain English request to a legal clause in legalese.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider system 110 may include one or more storage devices configured to store information used by processor 210 (or other components) to perform certain functions related to the disclosed embodiments. In one example, service provider system 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider system 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, service provider system 110 may include memory 230 that may include one or more programs 250 to perform one or more functions of the disclosed embodiments. Moreover, processor 210 may execute one or more programs 250 located remotely from service provider system 110. For example, service provider system 110 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include an image processing database 260 and a neural-network pipeline database 270 for storing related data to enable service provider system 110 to perform one or more of the processes and functionalities associated with the disclosed embodiments.

Service provider system 110 may also be communicatively connected to one or more memory devices (e.g., databases (not shown)) locally or through a network. The remote memory devices may be configured to store information and may be accessed and/or managed by service provider system 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Service provider system 110 may also include one or more I/O devices 220 that may include one or more interfaces for receiving signals or input from devices and providing signals or output to one or more devices that allow data to be received and/or transmitted by service provider system 110. For example, service provider system 110 may include interface components, which may provide interfaces to one or more input devices, such as one or more keyboards, mouse devices, touch screens, track pads, trackballs, scroll wheels, digital cameras, microphones, sensors, and the like, that enable service provider system 110 to receive data from one or more users (such as via computing device 120).

In example embodiments of the disclosed technology, service provider system 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While service provider system 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc.

Furthermore, other implementations of the terminal 110 may include a greater or lesser number of components than those illustrated.

Figure 3:
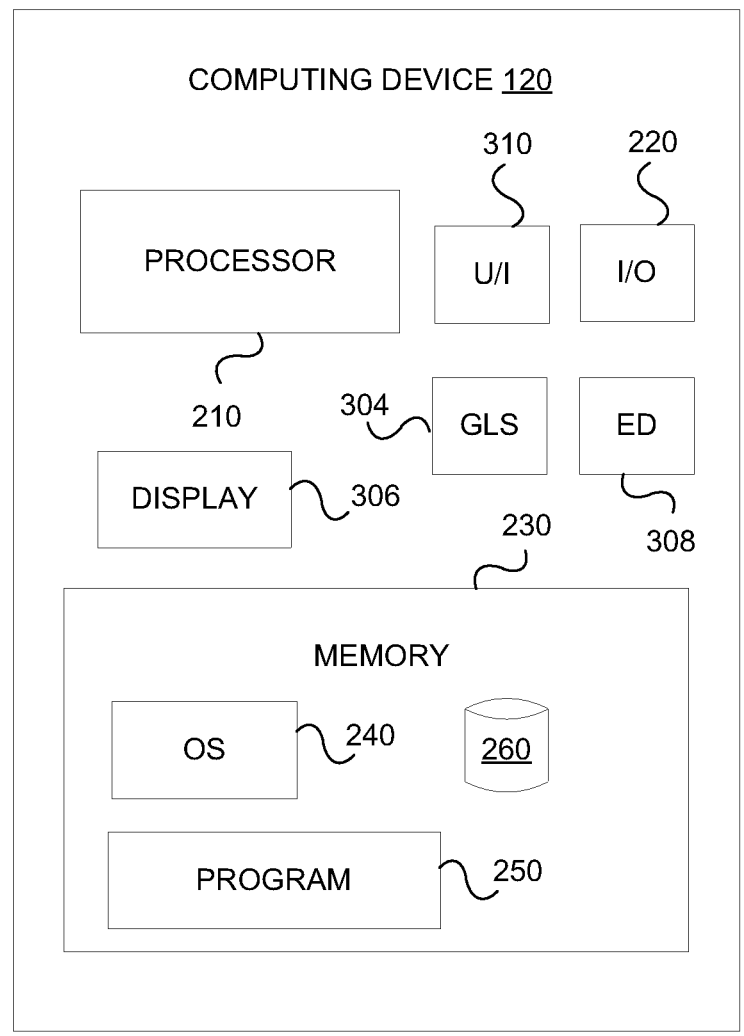
FIG. 3 is a component diagram of a computing device according to an example embodiment.

FIG. 3 shows an example embodiment of computing device 120. As shown, computing device 120 may include input/output ("I/O") device 220 for receiving data from another device (e.g., service provider system 110), memory 230 containing operating system ("OS") 240, program 250, and any other associated component as described above with respect to service provider system 110. Computing device 120 may also have one or more processors 210, a geographic location sensor ("GLS") 304 for determining the geographic location of computing device 120, a display 306 for displaying content such as text messages, images, and selectable buttons/icons/links, an environmental data ("ED") sensor 308 for obtaining environmental data including audio and/or visual information, and a user interface ("U/I") device 310 for receiving user input data, such as data representative of a click, a scroll, a tap, a press, or typing on an input device that can detect tactile inputs. User input data may also be non-tactile inputs that may be otherwise detected by ED sensor 308. For example, user input data may include auditory commands. According to some embodiments, U/I device 310 may include some or all of the components described with respect to input/output device 220 above. In some embodiments, environmental data sensor 308 may include a microphone and/or an image capture device, such as a digital camera.

Figure 4A:
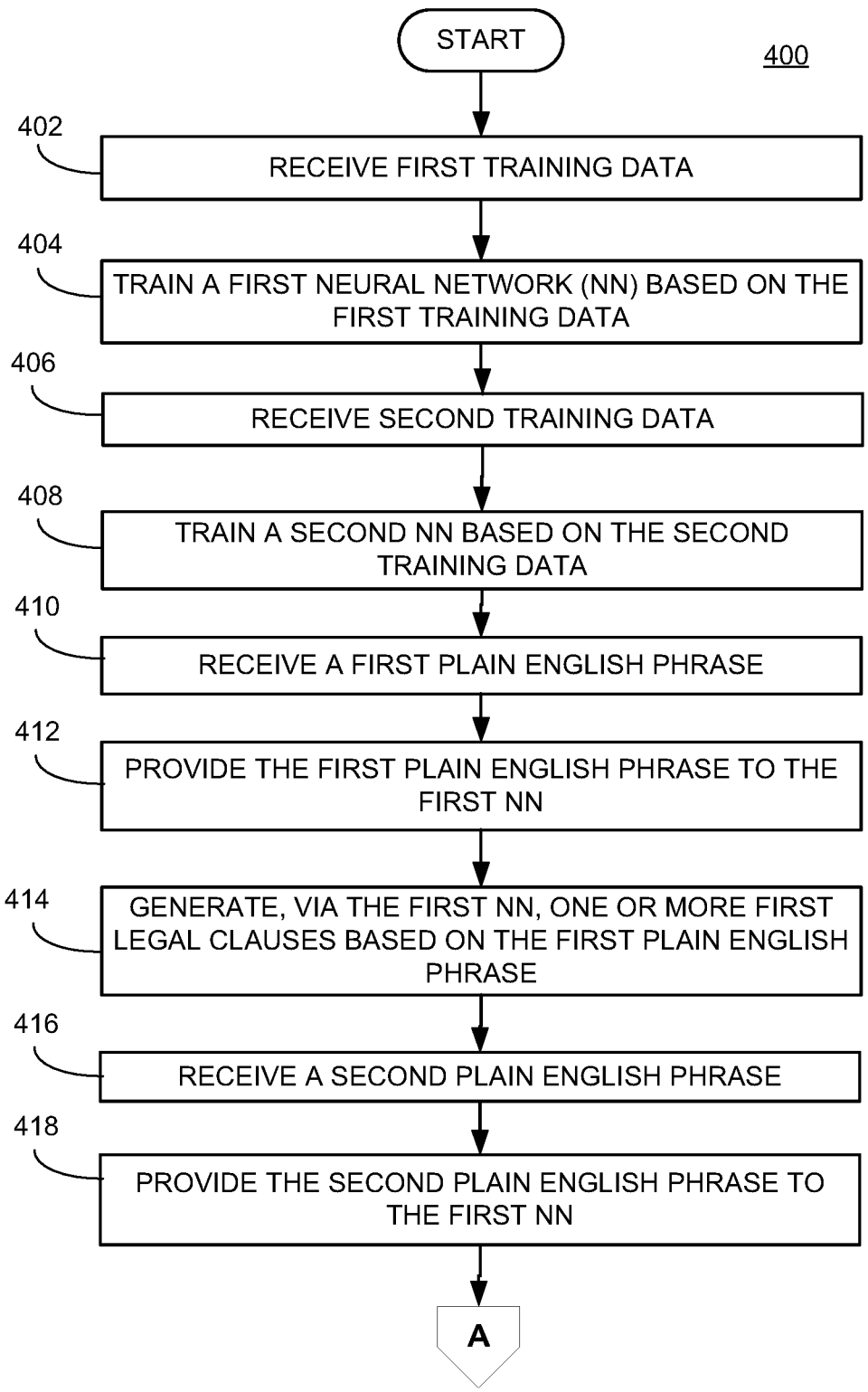
FIG. 4A and FIG. 4B are flowcharts of a method for generating a legal document based on a first plain English phrase and a second plain English phrase according to an example embodiment.
Figure 4B:
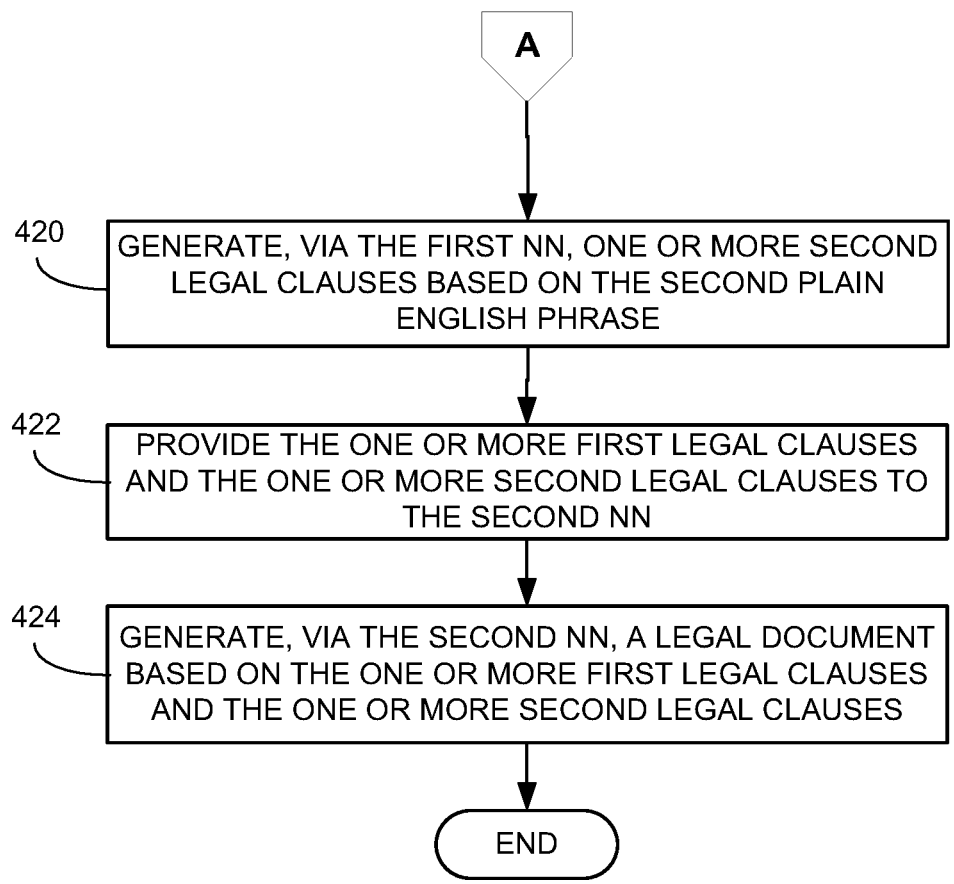

FIG. 4A and FIG. 4B show flowcharts of a method 400 for generating a legal document based on a first plain English phrase and a second plain English phrase according to an example embodiment. Method 400 may be performed by one or more of the service provider system 110 and the computing device 120.

In block 402, the system may receive first training data. The first training data may be plain English phrases paired with corresponding legal clauses.

In block 404, the system may train a first neural network (NN) based on the first training data. In other words, the system may provide the English phrases and corresponding legal clauses to the first NN. As discussed above, the first NN may be a recurrent neural network (RNN), a convolutional neural network (CNN), or a recurrent convolutional neural network (RCNN).

In block 406, the system may receive second training data. The second training data may be legal clauses paired with a corresponding legal document including all the legal clauses.

In block 408, the system may train a second neural network (NN) based on the second training data. In other words, the system may provide the legal clauses and corresponding legal document to the second NN. As discussed above, the second NN may be an RNN, a CNN, or an RCNN.

In block 410, the system may receive a first plain English phrase. The system may provide text box as a frontend user interface that receives a user input. The first plain English phrase may be a request for a clause of a non-disclosure agreement (NDA). For example, the first plain English phrase received from a user may be:

I would like a clause for an NDA stating that all written confidential materials be returned within three days upon a written request from our company and stating that the receiving party must hold the confidential material in confidence until released by us.

In block 412, the system may provide the first plain English phrase to the first NN. For example, the system may utilize an application programming interface (API) call or pass the text of the first plain English phrase to the NN.

In block 414, the system may generate, via the first NN, one or more first legal clauses based on the first plain English phrase. In some cases, the service provider system 110 generates the one or more first legal clauses. In other cases, the computing device 120 generates the one or more first legal clauses. In either case, a K-nearest neighbor algorithm or the first NN may be used, which may be an RNN or a CNN. The RNN, a CNN, or a K-nearest neighbor algorithm would predict how closely a request matches a potential model (e.g., NDA model) prior to generating the one or more first legal clauses. The one or more first legal clauses may include the following:

Upon the written request of the Disclosing Party, the Receiving Party shall return to the Disclosing Party all written materials containing or related to the Confidential Information within three days from the written request.

The Receiving Party shall keep the Confidential Information confidential until the Receiving Party receives a written notice from the Disclosing Party releasing the Receiving Party from the Receiving Party's confidentiality obligation.

In block 416, the system may receive a second plain English phrase. The second plain English phrase may be a request for a second clause in an NDA. For example, the second plain English phrase may be "I would like a clause for an NDA that deems our source code as confidential."

In block 418, the system may provide the second plain English phrase to the first NN. The system may utilize an API call or pass the text of the second plain English phrase to the NN.

In block 420, the system may generate, via the first NN, one or more second legal clauses based on the second plain English phrase. For example, the one or more second legal clauses may include the following:

"Confidential Information" shall include any data or information that has commercial value or other utility in business in which the Disclosing Party is engaged. Confidential Information specifically includes, but is not limited to, the Disclosing Party's source code and any information related to that source code.

In block 422, the system may provide the one or more first legal clauses and the one or more second legal clauses to the second NN. The system may simply pass the text of the one or more first legal clauses and the text of the one or more second legal clauses to the second NN.

In block 424, the system may generate, via the second NN, a legal document based on the one or more first legal clauses and the one or more second legal clauses. The second NN may be an RNN which utilizes sentence embeddings to generate the legal document from the one or more first legal clauses and the one or more second legal clauses. The legal document may be an NDA with the requested provisions as well as other boilerplate provisions such as choice of law provisions, severability provisions, etc.

The system may receive a correction of the legal document from a user. The system may iteratively re-train the first NN, the second NN, or both the first NN and the second NN based on the correction. For example, a registered user (who may be an attorney or other qualified legal professional) may review the legal document and the one or more legal clauses within the legal document. Upon review, a user may submit a correction to the service provider system 110 from a computing device 120 via the network 105. The correction may take the form of a negative reinforcement by submitting a corrected version of the one or more first legal clauses and/or the one or more second legal clauses. In some embodiments, the user (e.g., computing device 120) may submit positive reinforcement feedback to the service provider system 110. The positive reinforcement feedback would simply be confirming that the one or more first legal clauses and/or the one or more second legal clauses are accurate.

Figure 5:
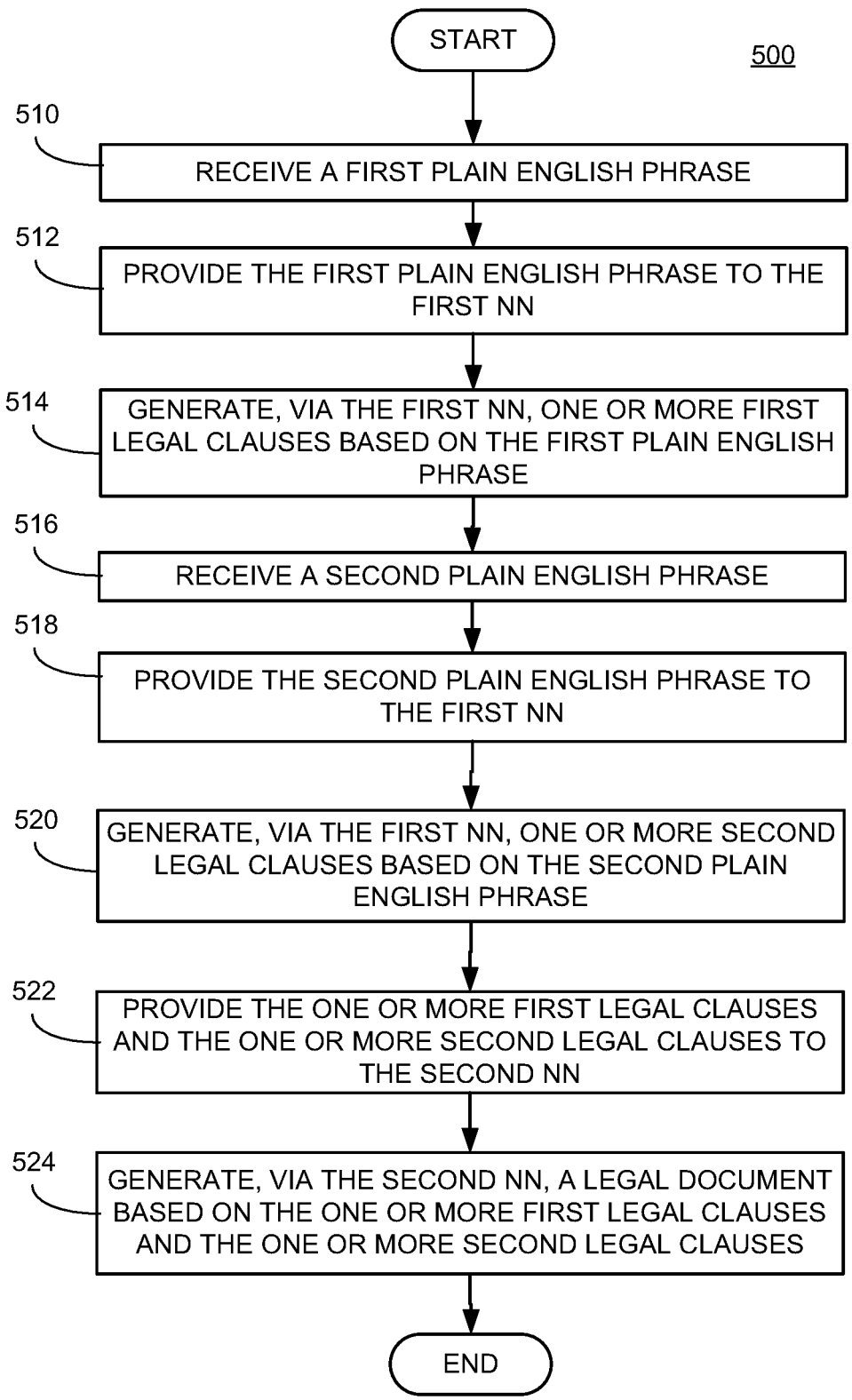
FIG. 5 is a flowchart of a method for generating a legal document based on a first plain English phrase and a second plain English phrase according to an example embodiment.

FIG. 5 shows a flowchart of a method 500 for generating a legal document based on a first plain English phrase and a second plain English phrase according to an example embodiment. Method 500 may be performed by one or more of the service provider system 110 and the computing device 120.

In method 500, blocks 510, 512, 514, 516, 520, 522, and 524 may be the same as or similar to blocks 410, 412, 416, 420, 422, 424, respectively, thus their descriptions will not be repeated for brevity.

Certain implementations provide the advantage of converting plain English to legal clauses. Thus, certain implementations make it easier to generate legal documents.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Case

The following example use case describes an example of a typical use of generating a legal document based on a first plain English phrase and a second plain English phrase. It is intended solely for explanatory purposes and not in limitation. In one case, after two RNN are trained from first training data and second training data, a user types into their portable laptop computer (e.g., computing device 120) a first plain English phrase such as "I would like a clause for an NDA stating that all written confidential materials be returned within three days upon a written request from our company and stating that the receiving party must hold the confidential material in confidence until released by us." The user then sends the first plain English phrase to the service provider system 110 via network 105 and computing device 120. The service provider system 110 then provides the plain English phrase to a first RNN. The service provider system 110, via the first RNN, generates one or more first legal clauses. For example, the service provider system 110, via the first RNN, may generate the following Upon the written request of the Disclosing Party, the Receiving Party shall return to the Disclosing Party all written materials containing or related to the Confidential Information within three days from the written request.

The Receiving Party shall keep the Confidential Information confidential until the Receiving Party receives a written notice from the Disclosing Party releasing the Receiving Party from the Receiving Party's confidentiality obligation.

The user types into their portable laptop computer (e.g., computing device 120) a second plain English phrase such as ""I would like a clause for an NDA that deems our source code as confidential." The user then sends the second plain English phrase to the service provider system 110 via network 105 and computing device 120. The service provider system 110 then provides the plain English phrase to a first RNN. The service provider system 110, via the first RNN, generates one or more second legal clauses. The one or more second legal clauses may include the following:

"Confidential Information" shall include any data or information that has commercial value or other utility in business in which Disclosing Party is engaged. Confidential Information specifically includes, but is not limited to, the Disclosing Party's source code and any information related to that source code.

The service provider system 110 then provides the one or more first legal clauses and the one or more second legal clauses to a second RNN. The second RNN utilizes sentence embeddings to generate a legal document based on the one or more first legal clauses, the one or more second legal clauses, and a database of boilerplate clauses for NDAs.

In some use cases, the service provider system 110 receives a correction of the legal document from a user. For example, the user may type into a chat window "The legal document should say that our proprietary information should be confidential." The service provider system 110 then may iteratively re-train first NN to make sure that the definition of Confidential Information for an NDA clause includes proprietary information.

What is claimed is:

1. A system, comprising:
one or more processors; and
a memory in communication with the one or more processors and storing instructions that, when executed by the one or more processors, are configured to cause the system to:
receive first training data;
train a first neural network (NN) based on the first training data;
receive second training data;
train a second NN based on the second training data;
receive a third training data;
train a third NN based on the third training data;
receive a first plain English phrase;
determine whether the first plain English phrase matches the first NN or the third NN using a K-nearest neighbor algorithm;
provide the first plain English phrase to the first NN or the third NN based on determining whether the first plain English phrase matches the first NN or the third NN;
generate, via the first NN or the third NN, one or more first legal clauses based on the first plain English phrase;
receive a second plain English phrase;

determine whether the second plain English phrase matches the first NN or the third NN using the K-nearest neighbor algorithm;
provide the second plain English phrase to the first NN or the third NN based on determining whether the second plain English phrase matches the first NN or the third NN;
generate, via the first NN or the third NN, one or more second legal clauses based on the second plain English phrase;
provide the one or more first legal clauses and the one or more second legal clauses to the second NN;
generate, via the second NN, a legal document based on the one or more first legal clauses and the one or more second legal clauses;
receive one or more corrected first legal clauses from a user device;
receive a confirmation that the one or more second legal clauses are accurate from the user device;
re-train the first NN or the third NN based on the one or more corrected first legal clauses received from the user device; and
re-train the second NN based on the confirmation received from the user device.

2. The system of claim 1, wherein the legal document generated is a terms of service document or a non-disclosure agreement.

3. The system of claim 1, wherein first training data comprises plain English phrases paired with respective legal clauses.

4. The system of claim 3, wherein the second training data comprises legal clauses and corresponding legal documents.

5. The system of claim 1, wherein the first NN is a first recurrent neural network (RNN), the second NN is a convolutional neural network (CNN), and the third NN is a second recurrent neural network trained with different training data than the first recurrent neural network.

6. The system of claim 1, wherein the first NN is a first recurrent neural network (RNN), the second NN is a second RNN, and the third NN is a third RNN.

7. The system of claim 6, wherein the second RNN utilizes sentence embeddings to generate the legal document from the one or more first legal clauses and the one or more second legal clauses.

8. The system of claim 1, wherein the first plain English phrase is a request to draft one or more particular clauses for the one or more first legal clauses.

9. A method for generating a legal document, comprising:
receiving first training data;
training a first neural network (NN) based on the first training data;
receiving second training data;
training a second NN based on the second training data;
receiving a third training data;
training a third NN based on the third training data;
receiving a first plain English phrase;
determining whether the first plain English phrase matches the first NN or the third NN using a K-nearest neighbor algorithm;
providing the first plain English phrase to the first NN or the third NN based on determining whether the first plain English phrase matches the first NN or the third NN;
generating, via the first NN or the third NN, one or more first legal clauses based on the first plain English phrase;
receiving a second plain English phrase;
determining whether the second plain English phrase matches the first NN or the third NN using the K-nearest neighbor algorithm;
providing the second plain English phrase to the first NN or the third NN based on determining whether the second plain English phrase matches the first NN or the third NN;
generating, via the first NN or the third NN, one or more second legal clauses based on the second plain English phrase;
providing the one or more first legal clauses and the one or more second legal clauses to the second NN;
generating, via the second NN, the legal document based on the one or more first legal clauses and the one or more second legal clauses;
receiving one or more corrected first legal clauses from a user device;
receiving a confirmation that the one or more second legal clauses are accurate from the user device;
re-training the first NN or the third NN based on the one or more corrected first legal clauses received from the user device; and
re-training the second NN based on the confirmation received from the user device.

10. The method of claim 9, wherein the legal document generated is a terms of service document or a non-disclosure agreement.

11. The method of claim 9, wherein first training data comprises plain English phrases paired with respective legal clauses.

12. The method of claim 11, wherein the second training data comprises legal clauses and corresponding legal documents.

13. The method of claim 9, wherein the first NN is a first recurrent neural network (RNN), the second NN is a convolutional neural network (CNN), and the third NN is a second RNN.

14. The method of claim 9, wherein the first NN is a first recurrent neural network (RNN), the second NN is a second RNN, and the third NN is a third RNN.

15. The method of claim 14, wherein the second RNN utilizes word embeddings and sentence embeddings to generate the legal document from the one or more first legal clauses and the one or more second legal clauses.

16. The method of claim 9, wherein the first plain English phrase is a request to draft one or more particular clauses for the one or more first legal clauses.

17. A system, comprising:
one or more processors; and
a memory in communication with the one or more processors and storing instructions that, when executed by the one or more processors, are configured to cause the system to:
receive a first plain English phrase;
determine whether the first plain English phrase matches a first NN or a third NN using a K-nearest neighbor algorithm;
provide the first plain English phrase to the first NN or the third NN based on determining whether the first plain English phrase matches the first NN or the third NN;
generate, via the first NN or the third NN, one or more first legal clauses based on the first plain English phrase;
receive a second plain English phrase;

determine whether the second plain English phrase matches the first NN or the third NN using the K-nearest neighbor algorithm;

provide the second plain English phrase to the first NN or the third NN based on determining whether the second plain English phrase matches the first NN or the third NN;

generate, via the first NN or the third NN, one or more second legal clauses based on the second plain English phrase;

provide the one or more first legal clauses and the one or more second legal clauses to a second NN;

generate, via the second NN, a legal document based on the one or more first legal clauses and the one or more second legal clauses;

receive one or more corrected first legal clauses from a user device;

receive a confirmation that the one or more second legal clauses are accurate from the user device;

train the first NN based on the one or more corrected first legal clauses received from the user device; and train the second NN based on the confirmation received from the user device.

18. The system of claim 17, wherein the first NN is a first recurrent neural network (RNN), the second NN is a convolutional neural network (CNN), and the third NN is a second RNN.

19. The system of claim 17, wherein the first NN is a first recurrent neural network (RNN), the second NN is a second RNN, and the third NN is a third RNN.

20. The system of claim 19, wherein the second RNN utilizes sentence embeddings to generate the legal document from the one or more first legal clauses and the one or more second legal clauses.

* * * * *